United States Patent Office 3,328,177
Patented June 27, 1967

3,328,177
COMPLETE BEAN MEAL PACKAGE
Ralph Fine, East Brunswick, N.J., assignor to Colgate-Palmolive Company, New York, N.Y., a corporation of Delaware
No Drawing. Filed Nov. 15, 1963, Ser. No. 323,913
9 Claims. (Cl. 99—171)

This invention relates to leguminous food products. More particularly, this invention relates to a packaged food product which can be used as a complete bean meal and which is composed of cooked dried beans and various other dry ingredients.

Baked beans, beans in tomato sauce, and chili beans, packaged in cans are well-known commodities to the consumer. These canned bean products are in a wet state, i.e., the beans contain at least as much moisture as they contained in the natural state and are in contact with a fluid sauce. Although these products were generally satisfactory, they did not and could not approach the taste of home cooked baked beans, chili beans, etc. Attempts to supply the consumer with a complete bean and sauce meal having a flavor approaching that of a home cooked bean meal met with failure because of the nature and composition of the canned, so called wet bean product.

Additionally, although bean soups are well-known in the art, beans in sauce could not be prepared by analogizing to the processes involved in preparing bean soup from dried products. This was so because if too much water is added to a complete bean in sauce meal, the beans would mush, i.e., assume a mushy texture and an amorphous form. Furthermore, if too little water is added to a dry bean with dry sauce composition, some of the beans will remain hard due to inadequate rehydration. This problem was not common to bean soups prepared from dry mixes because it is immaterial to a soup whether the beans retain their original form, shape, and consistency or whether the beans are mushed, since soups can be made as thick or as thin as the consumer desires without adversely affecting the desirability of the soup.

Previously, a cooked dry bean meal for home preparation could not be supplied to the consumer because such meals were packaged in sealed containers. These sealed non-air permeable containers did not allow the beans to breathe, thereby causing the beans to become rancid within a short period of time. If, however, dried cooked beans are left outside of a container and exposed to air, the beans will also spoil within a short period of time even if normal levels of anti-oxidant are used.

Furthermore, a dry sauce cannot be directly mixed with cooked dried beans in an air permeable package since the dry bean sauce will be adversely affected by exposure to the atmosphere for a short period of time. For example, the sauce will become rancid, the aromatic sauce components would lose their potency, and the sauce would cake.

Similarly, a dried meat product cannot be packaged with cooked dried beans in an air permeable package because although the cooked dried beans must breathe, exposure of dried meat to air and moisture causes it to spoil, e.g., exposure to air and moisture promotes microbial growth on the meat and also causes rancidity of the meat.

Broadly, this invention contemplates a food package for a complete bean dinner, comprising a closed outer container, said container being permeable to air, cooked dehydrated beans disposed within said closed container, said beans having an intact particulate bean form, a moisture and air impermeable sealed inner container disposed within said outer container, and a dry aromatic sauce disposed within said inner container.

This invention also contemplates a process for preparing baked beans comprising placing in a cooking utensil, a dry composition comprising cooked dried beans in intact particulate bean form and dry sauce in a weight ratio of from about 5 to 7 parts of beans for about 3 to 5 parts of dry sauce, adding water to said cooking utensil in an amount by weight of from about 2 to about 3⅔ times the weight of said dry composition, covering said cooking utensil and cooking the contents of said covered cooking utensil at a temperature of from about 400° F. to about 500° F. for from about 15 minutes to about 25 minutes, removing the cover from said cooking utensil, and cooking at said temperature until a crust forms and terminating the cooking of said baked beans, whereby the crusted beans now have, by virtue of the crust, a home prepared flavor and appearance.

Among the beans which can be used in practicing this invention are those beans commonly referred to as navy, pinto, red, Mexican black, kidney, yellow, pea, lima beans and the like. These beans may be cooked and dehydrated without destroying the intact particulate bean form.

Cooked, dehydrated beans in intact particulate bean form may be prepared via a number of methods. One method of preparing the beans used in this invention is by exposing the beans to atmospheric steam for about one-half hour. The beans are then placed in tanks of water and allowed to remain there overnight to assure full moisture absorption by the beans. The fully hydrated beans are then pressure cooked for about 10 minutes, and are subsequently transferred to a tank containing cold water in which the beans are raised and lowered to remove surface heat. The beans are then transferred to an air dehydrator and are partially dehydrated to about 10% moisture or less. The partially dehydrated beans are then further air dehydrated so that the moisture content is generally less than 8%.

Although one method of cooking and dehydrating the beans has been described, the invention is not to be construed as limited to any one particular method of cooking and dehydrating beans as other methods are well known and apparent to one skilled in the art.

The weight ratio of cooked dried beans to dry sauce may vary widely. Generally, the beans should be present in a weight ratio of from about 5 to 7 parts for about 3 to 5 parts of the dry sauce, as optimum results have been obtained using this ratio.

The sauce which is used is a dry sauce containing numerous flavoring ingredients, some of which are aromatic. Among the dry ingredients which may be used in preparing a dry sauce, are the following: tomato, sugar, onion, lard, molasses, sodium chloride, bacon flavor, garlic powder, tomato spice, maple flavor, mustard powder, hickory smoke, beef flavor, red pepper, origanum, chili powder, thickening agent and the like. Other dry sauce ingredients, not specifically set forth, or combinations of any of the above-exemplified, as well as non-exemplified, ingredients may also be used. Other dry sauce ingredients will be apparent to one skilled in the art.

The dry sauce used will generally have a moisture content of 8% or less. A moisture content of more than 8% is generally undesirable because such a higher moisture content may cause the ingredients of the sauce to cake, become rancid, and/or moldy.

When packaging the complete bean course, the sauce must be in a gas- and moisture-impermeable sealed container. If the sauce is not in a gas and moisture-impermeable container, then, because of the volatile nature of many of the sauce ingredients, the sauce will tend to lose its flavoring power. Additionally, an air- and moisture-impermeable container, by preventing the sauce from acquiring additional moisture, protects the sauce from caking, becoming rancid, and/or becoming moldy. Generally speaking, any moisture- and air-impermeable container may be used for the sauce, such as a sealed metal can, but because the sealed container will be disposed within an outer container and will be surrounded by the beans, it is preferred that the sauce container be made of a flexible material so that the beans will be cushioned from, and will not break against, the walls of the sauce container during handling. Amony the preferred air- and moisture-impermeable flexible packaging materials are metallic foils or metallic foil laminates, as for example, aluminum foil or aluminum foil laminated to paper or plastic.

If desired, the package containing a complete bean dinner may also include up to about 18 percent of a dried meat and/or dry plant protein based on the total weight of the dry beans and dry sauce. Any dried meat and/or dry plant protein may be used. Exemplary of the meats which may be used in practicing this invention are dried beef, dried pork, dried ham, dried veal, dried lamb, dried mutton, dried poultry, dried fish, and the like.

Among the sources of plant protein which may be used in the like composition are extracted soy flour, wheat gluten and the like.

The moisture content of the dried meat and/or dry plant protein should generally not exceed about 8%. If the moisture content of the dried meat and/or dry plant protein exceeds 8%, then it is possible that the meat and/or dry plant protein may become microbially spoiled and that the meat may become rancid.

If a dried meat or dry plant protein is to be included with the complete bean meal, then the dried meat and/or plant protein may be included in the same sealed container in which the sauce is disposed. However, if the equilibrated moisture content of this combination or combinations exceeds the appropriate moisture levels for either the meat, plant protein or sauce, it is advisable to package the meat and/or dry plant protein in a separate sealed air- and moisture-impermeable container to assure that the dry plant protein, dried meat and the dry sauce maintain their appropriate moisture levels.

The cooked dried beans must be packaged in an air-permeable container having microscopic air passages through the walls of the container. However, the beans cannot be packaged in a container which has air passages which permit light to pass unobstructed through the container walls because this will allow too much circulating air to come in contact with the beans. If the beans are in contact with too much air, then the beans will become rancid within a short period of time. In contrast with this, if the beans are in an air-impermeable container so that a static air system exists over the beans, then the beans will not be able to breathe, thereby causing the beans to become rancid.

The packaging materials which can be used as containers to package the dried cooked beans are those materials which have microscopic passages therethrough to permit the tranmission of air through the container walls. Containers made of the following materials may be used as an outer container for the cooked dried beans: chip board, open cell polyurethane foam, polyethylene, polypropylene, and other materials and combinations thereof which have suitable microscopic air passages therethrough.

Whether the air passages through the container walls of a non-transparent material such as chip board would permit light to pass unobstructed through said walls, can be easily determined by taking a flat sample of any portion of the container and holding it up to a source of light. If any light other than translucent light can be seen through the flat sample, then the container has air passages which are too large, and the container cannot be used as a package for the cooked dried beans.

When packaged, the beans are disposed in the outer gas-permeable container. The sealed gas- and moisture-impermeable inner container is disposed within the outer container and is substantially surrounded by the beans.

If desired, the outer container may have overprinting, i.e., the container may be completely covered by printer's ink. Although covering of the container by printer's ink may partially close some of the microscopic air passages, it normally will not completely close these passages so as to preclude the breathing of the beans.

When preparing a complete bean meal for ingestion, such as for example baked beans, the amount of water added thereto is critical. If too much water is added to the beans during preparation, the beans will tend to lose their intact particulate bean form and will tend to assume a mushy texture and amorphous form. Generally, water is added to the dry bean dinner in an amount of from about 2 to 3⅔ times the weight of the dry bean dinner components or meal. If the amount of water added is less than 2 times the weight of the dry bean meal or components, then the beans may not adequately rehydrate. If the amount of water added is more than 3⅔ times the weight of the dry bean meal, then the beans will tend to mush. The complete bean meal may be prepared at temperatures of from 400° F. to 500° F.

When preparing a complete baked bean meal, both the cooked dried beans and the dry sauce are placed in a suitable casserole and water is added to the cooking utensil. The cooking utensil is then covered and placed in a preheated oven at the proper temperature. After from about 15 to about 25 minutes, the cover is removed from the cooking utensil, the composition is stirred, and the baked bean dinner is permitted to remain at that temperature until a crust forms.

The formation of this crust is highly desirable to the preparation of a complete baked bean dinner. The presence of a crust adds a home-cooked flavor and appearance to the baked beans, i.e. the taste and appearance of the baked beans prepared according to the process of this invention is of the nature of baked beans prepared by a consumer using fresh raw beans and the consumer's own sauce composition. Generally, from 10 to 40 minutes are required to form this crust. After the crust has formed, the bean dinner is removed from the source of heat and may then be consumed.

If one desires to prepare chili con carne or creole beans, the dry bean meal components are placed in a suitable cooking utensil such as a sauce pan. The appropriate amount of water is then added to the components and the composition is brought to a boil. The cooking utensil may then be covered and the contents of the cooking utensil are gently boiled for from about 15 to 30 minutes. If desired, the contents of the cooking utensil may be briefly stirred at any time during preparation of the bean course or dinner.

In order to illustrate more fully the nature of this invention and the manner of practicing the same, the following examples are presented.

EXAMPLE 1

A complete bean meal is prepared as follows. The bean meal package is composed of the following: an outer chip board container with a gummed label on one portion of the container, the cooked dried beans in intact particulate bean form being disposed within this outer container. An inner gas- and moisture-impermeable aluminum foil laminate pouch containing the dry sauce ingredients is disposed inside the outer container and is surrounded by the cooked dried beans. When the outer container and the pouch are opened after standing for at least 3 months at ambient atmospheric conditions, the contents exhibit no sign of mold or rancidity. The following components and their amounts are used in the package:

| Ingredient | Grams | Moisture content, percent |
|---|---|---|
| Dry Sauce | 130.67 | Less than 8. |
| Cooked Dried Navy Beans | 190.00 | Less than 8. |
| Water | 660.00 | |

The beans and sauce are placed in a suitable cooking utensil such as a casserole. Water is then added to the casserole and the contents are mixed to uniformity. The casserole is covered and placed into a preheated baking oven set at a temperature of 450° F. The bean meal ingredients remain in the covered casserole at that temperature for 20 minutes. After 20 minutes has elapsed, the cover is removed, and the product is stirred briefly. The complete bean meal ingredients are allowed to bake in the oven for an additional 10 minutes with the cover removed. At the end of the additional 10 minute period of time, a crust is formed. The bean meal, containing beans in an intact particulate bean form, is then removed from the oven, served and eaten. The bean meal has a unique home-cooked flavor and appearance.

EXAMPLE 2

The complete bean dinner ingredients are packaged in the following manner. The cooked dried beans, in intact particulate bean form, are packaged in a chip board container with a gummed label on one side of the container. The dry sauce is packaged in a flexible aluminum foil laminate inner pouch which is disposed amidst the beans. The dried meat, which in this case is dehydrated beef, is packaged in a second sealed aluminum foil laminate inner pouch and is also disposed amidst the beans. When the container and pouches are opened, after standing for at least 3 months at ambient atmospheric conditions, it is observed that the bean dinner components are fresh and exhibit no evidence of mold, rancidity or caking. The packaged complete bean meal has the following composition.

| Ingredient | Grams | Moisture content, percent |
|---|---|---|
| Dry Sauce | 65.42 | 5.5. |
| Dried Beef | 28.00 | 2.5. |
| Pinto Beans | 140.00 | Less than 8. |
| Water | 840.00 | |

To the bean meal ingredients in a sauce pan are added 840 grams of water. The sauce pan is placed on top of the stove and the composition is gently brought to a boil and maintained there for 20 minutes. A delicious chili con carne meal containing beans in an intact particulate bean form, is thus prepared.

EXAMPLE 3

This example illustrates the preparation of creole beans. The cooked dried beans, in intact particulate bean form, are packaged in a chip board container with a gummed label on one side of the container. The dry sauce is packaged in a flexible aluminum foil laminate pouch which is disposed amidst the beans. When the container and pouch are opened after standing for at least 3 months at ambient atmospheric conditions, it is observed that the bean dinner components are fresh and exhibit no evidence of mold, rancidity or caking. Moreover, when the pouch containing the sauce is opened, the sauce ingredients have a strong aromatic pleasant scent.

The packaged complete bean meal has the following composition:

| Ingredient | Grams | Moisture content, percent |
|---|---|---|
| Dry Sauce | 78.44 | Less than 8. |
| Navy Beans | 160.00 | Less than 8. |
| Water | 720.00 | |

The bean dinner ingredients are placed in a sauce pan and 720 grams of water are added thereto. The sauce pan is placed on top of the stove and the composition is gently brought to a boil and maintained there for 25 minutes. At the end of that time heating is discontinued and the contents of the sauce pan are removed and served. A delicious creole bean dinner containing beans in an intact particulate bean form is thus prepared.

The bean dinners or bean meals thus prepared have an excellent flavor. Moreover, attention is invited to the fact that the bean meal can remain in the package for at least 3 months without spoilage in either the contents of the outer container or the contents of the inner container or containers.

While this invention has been described in terms of certain preferred embodiments and illustrated by means of specific examples, the invention is not to be construed as limited except as set forth in the following claims:

What is claimed is:

1. A food package for a complete bean meal comprising a closed outer container, said container being permeable to air, cooked dried beans disposed within said closed container, said beans having an intact bean form and a moisture content of less than 8% by weight thereof, a moisture- and air-impermeable sealed inner container within said outer container, and a dry aromatic sauce having a moisture content of 8% or less by weight thereof disposed within said inner container.

2. A food package according to claim 1 wherein there is present an air- and moisture-impermeable flexible sealed second inner container and dried meat having a moisture content not exceeding about 8% by weight thereof disposed within said second sealed container, said dried meat being present in an amount of up to about 18% by weight of the total weight of said beans and said dry sauce.

3. A food package according to claim 1, wherein said air-permeable outer container is chip board.

4. A food package for a complete bean meal comprising a closed outer container, said container being permeable to air, cooked dried beans disposed within said closed container, said beans having an intact bean form and a moisture content of less than 8% by weight thereof, a moisture- and air-impermeable flexible sealed metallic foil inner container within said outer container, and a dry aromatic sauce having a moisture content of 8% or less by weight thereof disposed within said inner container.

5. A food package for a complete bean meal comprising a closed outer container, said container being permeable to air, cooked dried beans disposed within said closed container, said beans having an intact bean form and a moisture content of less than 8% by weight thereof, a moisture- and air-impermeable flexible sealed metallic foil inner container within said outer container, said inner container being composed of a metal selected from the class consisting of aluminum foil and aluminum foil laminates, and a dry aromatic sauce having a moisture content of 8% or less by weight thereof disposed within said inner container.

6. A food package for a complete bean meal comprising a closed outer container, said container being permeable to air, cooked dried beans disposed within said closed container, said beans having an intact bean form and a moisture content of less than 8% by weight thereof, a sealed inner container of a moisture- and air-impermeable flexible aluminum foil paper laminate, and a dry aromatic sauce having a moisture content of 8% or less by weight thereof disposed within said inner container.

7. A food package for a complete bean meal comprising a closed outer container, said container being permeable to air, cooked dried beans disposed within said closed container, said beans having an intact bean form a moisture content of less than 8% by weight thereof and comprising at least one-half the weight of said complete dry bean meal, a moisture- and air-impermeable sealed inner container within said outer container, and a dry aromatic sauce having a moisture content of 8% or less by weight thereof disposed with said inner container.

8. A food package for a complete bean meal comprising a closed outer container, said container being permeable to air, cooked dried beans disposed within said closed container, said beans having an intact bean form and a moisture content of less than 8% by weight thereof, a moisture- and air-impermeable sealed inner container within said outer container, and a dry aromatic sauce having a moisture content of 8% or less by weight thereof disposed within said inner container, said beans being present in a weight ratio to said sauce of from about 5 to about 7 parts of cooked dried beans for from about 3 to about 5 parts of dry sauce.

9. A food package for a complete bean meal comprising a closed outer container, said container being permeable to air, cooked dried beans disposed within said closed container, said beans having an intact bean form and a moisture content of less than 8% by weight thereof, a moisture- and air-impermeable sealed inner container within said outer container, and a dry aromatic sauce having a moisture content of 8% or less by weight thereof disposed within said inner container, said bean meal including a proteinaceous material having a moisture content not exceeding about 8% by weight thereof and selected from the class consisting of dried meat and plant protein, said proteinaceous material being present in an amount of up to about 18% by weight of the total weight of the dried beans and the dry sauce.

References Cited
UNITED STATES PATENTS 2,236,641   4/1941   Karmen _____ 99—124
2,971,851   2/1961   Kurtz _____ 99—171

A. LOUIS MONACELL, *Primary Examiner.*

S. E. HEYMAN, *Assistant Examiner.*